W. M. RAYMOND.
VEHICLE BRAKE.
APPLICATION FILED JULY 16, 1920.

1,429,771.  Patented Sept. 19, 1922.

Inventor
William M. Raymond

By
Attorney

Patented Sept. 19, 1922.

1,429,771

UNITED STATES PATENT OFFICE.

WILLIAM M. RAYMOND, OF STAMFORD, CONNECTICUT.

VEHICLE BRAKE.

Application filed July 16, 1920. Serial No. 396,723.

*To all whom it may concern:*

Be it known that I, WILLIAM M. RAYMOND, a citizen of the United States, residing at Stamford, in the county of Fairfield and State of Connecticut, have invented certain new and useful Improvements in Vehicle Brakes, of which the following is a specification.

The object of my said invention is to provide a brake to be attached to vehicles, particularly heavy trucks, which will automatically operate to prevent backward movement of such vehicles in going up-hill, and it consists in details of construction and arrangement of parts whereby these objects are accomplished, all as will be hereinafter more fully described and claimed.

Figure 1:
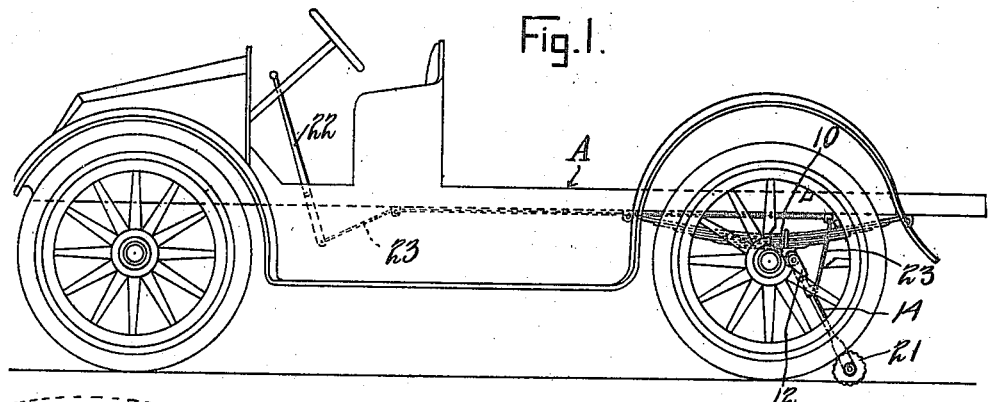
Figure 2:
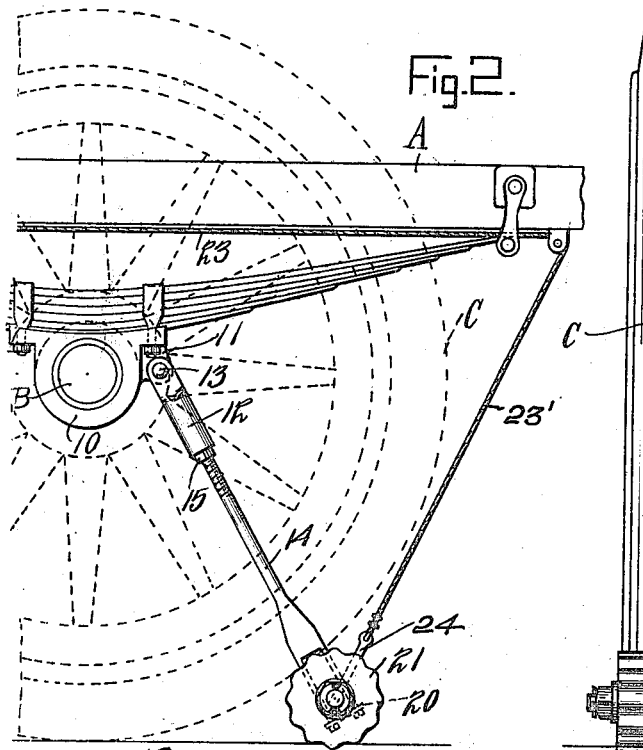
Figure 3:
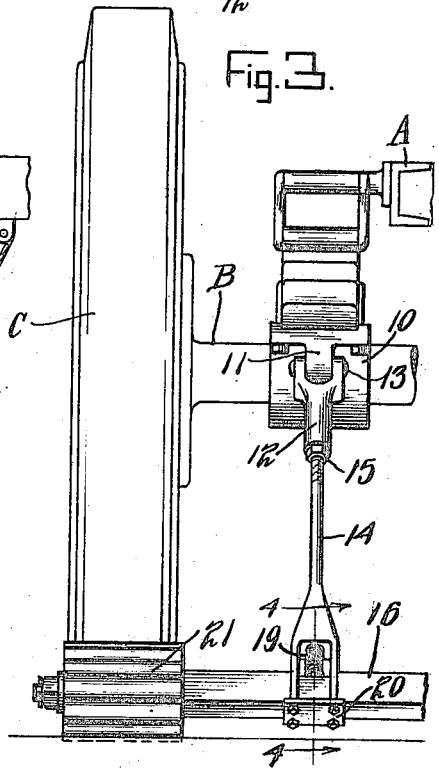
Figure 4:
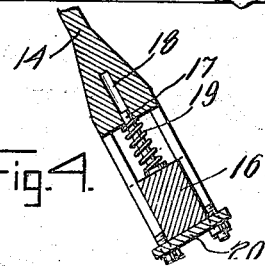

Referring to the accompanying drawings, which are made a part hereof and on which similar reference characters indicate similar parts, Figure 1 is a side elevation of a truck equipped with my improved brake, Figure 2 a detail view showing a portion of the same parts that are illustrated in Figure 1 but on an enlarged scale and in slightly modified form, Figure 3 is a rear elevation of one wheel and one end of the brake device of Figure 2, and Figure 4 a detail section on the dotted line 4—4 in Figure 3.

In said drawings, the portions marked A represent the vehicle frame or body, B the axle, and C the wheels, all of which parts are or may be of any ordinary type and require no special description.

Attached to the axle, preferably as a part of the spring clamp 10, is a bracket 11 to which one end 12 of a two-part arm is mounted on a pivot 13. The other part 14 of said arm is connected to part 12 by a screw-threaded connection to provide for its adjustment lengthwise, the required adjustment being secured by a jam nut 15.

It will be understood, of course, that these parts are duplicated at the other end of the axle B. The two arms thus provided and mounted carry a cross-bar 16 on their lower ends. Said cross-bar 16 is preferably mounted in a slot or way provided on the lower end of member 14 so as to adapt it for a sliding movement therein. A pin 17 is mounted in the upper side of bar 16 near each end which engages with a perforation 18 in the lower end of member 14. A spring 19 is interposed between the upper edge of bar 16 and the lower end of member 14 at each end of the bar, said spring being preferably a coiled spring surrounding said pin 17. Said spring serves to normally hold bar 16 in its downward or outward position against the clips 20, as best shown in Figure 4.

Each end of bar 16 is formed with gudgeons on which are mounted rollers 21 preferably formed with serrated or fluted surfaces and of rubber or similar material.

In operation, the driver, through the medium of a lever 22 adjacent to the seat and a connecting cord 23 running over appropriate sheaves, and attached to bar 16, as shown in Figure 2, or to rods 14, as shown in Figure 1, is enabled to raise or lower the frame composed of the arms and bar 16 carrying the rollers 21. When approaching a steep up-grade, the operator should drop said frame so that the rollers 21 will fall immediately behind the wheels C on the ground and just clear of contact therewith. Any backward movement of the vehicle caused by stopping or for other reasons, causes wheel C to impinge upon the rollers 21 and the rollers 21 to impinge upon the pavement, thus effectually locking the wheels and preventing the backward movement of the vehicle.

The springs 19 serve to keep the bar 16 in its outermost position and the rollers out of contact with the tire of the wheel under normal conditions, but immediately upon the vehicle's starting back they will compress and permit the rollers to come into operative position beneath the tires and perform the function for which they are intended.

In the modified form shown in Figures 2 and 3 the cord 23′ extends under the middle of the vehicle and is attached by link 24 to bars 16 midway between the rollers 21.

Having thus fully described my said invention, what I claim as new and desire to secure by Letters Patent is:

1. A vehicle brake comprising adjustable bars pivoted to the axle of the vehicle, a cross-bar carried to slide in ways in the lower ends of said pivoted bars, and extending substantially the width of the vehicle, springs for normally holding said cross-bar in its outward position, rollers with corrugated surfaces carried by means of said cross-bar in position to come beneath the wheel of the vehicle, and means for raising and lowering said device to bring it toward or away from the ground, substantially as set forth.

2. A chocking device for wheeled vehicles comprising a bar pivoted adjacent and parallel to the axis of the wheel, a pivot on the bar extending parallel to the axis of the wheel and a roller on said pivot adapted on lowering of the bar to contact with the wheel and the ground, said roller having longitudinal ribs parallel with its axis, substantially as set forth.

In witness whereof, I have hereunto set my hand and seal at Stamford, Connecticut this fourteenth day of July, A. D. nineteen hundred and twenty.

WILLIAM M. RAYMOND. [L. S.]

Witnesses:
    FLOYD B. BARTRAM,
    FLORENCE M. KILDUFF.